US006400772B1

(12) United States Patent
Chaplik

(10) Patent No.: US 6,400,772 B1
(45) Date of Patent: Jun. 4, 2002

(54) LINE INTERFACE AND METHOD FOR DETECTING AND ELIMINATING AN IMPEDANCE MISMATCH BETWEEN A TRANSCEIVER AND A TRANSMISSION LINE

(75) Inventor: Naom Chaplik, San Diego, CA (US)

(73) Assignee: RC Networks, San Diego, CA (US)

( * ) Notice: Subject to any disclaimer, the term of this patent is extended or adjusted under 35 U.S.C. 154(b) by 0 days.

(21) Appl. No.: 09/098,139

(22) Filed: Jun. 16, 1998

(51) Int. Cl.$^7$ .............................. H04B 3/00; H04M 7/04; H03H 7/38
(52) U.S. Cl. ....................... 375/258; 379/398; 333/17.3; 333/32
(58) Field of Search ................................. 375/258, 222, 375/220, 377, 257; 379/398, 399, 394, 402; 326/30; 333/17.3, 32

(56) References Cited

U.S. PATENT DOCUMENTS

| | | | |
|---|---|---|---|
| 1,957,752 A | 5/1934 | Avery | 179/171 |
| 3,982,080 A | 9/1976 | Ukeiley | 179/170 |
| 4,096,362 A | 6/1978 | Crawford | 179/170 |
| 4,103,118 A | 7/1978 | Bergman | 179/170 |
| 5,034,978 A | 7/1991 | Nguyen et al. | 379/402 |
| 5,133,007 A | 7/1992 | Nishimura | 379/405 |
| 5,204,854 A | 4/1993 | Gregorian et al. | 370/32.1 |
| 5,555,263 A | 9/1996 | Fong et al. | 370/252 |

FOREIGN PATENT DOCUMENTS

WO    WO 99/03200    1/1999

OTHER PUBLICATIONS

Search Report for PCT/US99/12924.

Patent Abstracts of Japan, Application No. 62168418, Application Date Jun. 7, 1987.

Primary Examiner—Betsy L. Deppe
(74) Attorney, Agent, or Firm—Gray Cary Ware & Freidenrich

(57) ABSTRACT

A line interface apparatus includes a line coupling transformer having first and second windings, and an impedance matching circuit connected to the first winding. The impedance matching circuit includes a first section characterized by a first impedance, a second section characterized by a second impedance, and a switch circuit, connected to the first and second sections and to the first winding of the line coupling transformer, for switching either the first or the second section in series with the first winding of the line coupling transformer. An echo of a transmitted signal is replicated and subtracted from a composite signal comprising a received signal and the echo of the transmitted signal. The result of the subtraction is compared to a threshold value to indicate whether a loop connected to the second winding of the line coupling transformer has an impedance about equal to a first impedance or about equal to a second impedance. If the result of the subtraction is at least as great as the threshold value, an arm of a switch is connected to the first inductive circuit, and if the result is less than the threshold value, the switch arm is connected to the second inductive. The output impedance of the interface is thereby automatically matched to the input impedance of a loop connected to the second winding of the line coupling transformer.

20 Claims, 4 Drawing Sheets

GOOD IMPEDANCE MATCHING

POOR IMPEDANCE MATCHING

LINE INTERFACE AND METHOD FOR DETECTING AND ELIMINATING AN IMPEDANCE MISMATCH BETWEEN A TRANSCEIVER AND A TRANSMISSION LINE

BACKGROUND OF THE INVENTION

The invention concerns adjusting the output impedance of a line interface to accommodate the impedance of a transmission line with taps for the efficient coupling of power to the transmission line. More particularly, the invention concerns a line interface and a method for matching the output impedance of a transceiver with the input impedance of a transmission line with taps. More particularly, the invention concerns the efficient output of a maximum amount of power to the transmission line.

High bit rate digital service lines (HDSL) are used to transmit digitized information over standard telephone lines. In this and other telephony applications, the transmission line is commonly referred to as a "loop". A common problem with full-duplex communication over a loop with taps is inefficient power output to the loop due, to an impedance mismatch at the interface between the loop and a transceiver.

One or more taps may exist at various locations on a loop. These taps, which are provided for future connection to the loop are typically unloaded. Loop impedance $Z_{loop}$ is a function of the location and number of taps in the loop. A tap located near an end of the loop can significantly affect the value of $Z_{loop}$. Accordingly, if due to the presence taps, the value of $Z_{loop}$ differs from the value of $Z_{out}$ which characterizes an output impedance driving the loop, signal power transferred to the loop will be reduced.

The ANSI T1E1.4196-006 and ETS1 ETR 152 standards define ten test loops for a transceiver. The loops are designated as one through ten. Because of taps, the loop impedance of some of the loops, for example the loops designated two, seven, and nine, are known to be "problematic" at the customer premises (CP) side of a loop. The remaining loops (one, three-six, eight, and ten) are deemed "non-problematic" because they exhibit loop impedances that are relatively unaffected by taps. In this regard, $Z_{loop}$ for one ANSI loop configuration (say, loop 2) may be in excess of 110 ohms, while the loop impedance for one of the problematic loops may be about 20 ohms. Consequently, a transceiver designed to drive the first loop will very inefficiently drive the problematic loop. Table 2B in the appendix lists the input impedances of loop 6 and loop 2 at several frequencies $f_i$ of interest. Table 2C in the appendix lists the input impedances of loop 7 and loop 9 at several frequencies of interest. Loop 6 is an example of a loop without taps. Loops 2, 7, and 9 are examples of loops with taps close to the CP side of the loops.

FIG. 1 illustrates a circuit commonly used as an interface to a loop 25. A shortcoming of this circuit is that the output impedance $Z_{out}$ of the interface is matched to only one value of input impedance $Z_{loop}$ of the loop 25.

For the circuit shown in FIG. 1:

$$Z_{out}=2RL(n^2)+Rtr\approx 135 \text{ ohms,}$$

where, $$RL=RL1=RL2\approx 16.7 \text{ ohms,}$$

$n\approx 2$, (with "n" being the ratio of the number of turns $N_2$ of the secondary of the transformer T to number of turns $N_1$ of the primary of the transformer T), and $Rtr\approx 1.4$ ohms, (with Rtr being the winding resistance of the primary side of the transformer T).

Generally, $Z_{loop}=R+jX$. In the circuit illustrated in FIG. 1, for the case when the loop has no taps, for frequencies f>100 kHz, X equals about 0, R equals about 108 ohms, and consequently $Z_{loop}$ equals about 108 ohms. For frequencies f<100 kHz, X equals about −1/jwc, R equals about 108 ohms, as a consequence $Z_{loop}$ may be greater than about 135 ohms. Thus, for the case of no taps connected to the loop, 135 ohms is a reasonable estimate of the value of $Z_{loop}$ for frequencies both greater than and less than 100 kHz. A simplified schematic diagram of the relationship between $Z_{out}$ and $Z_{loop}$ is illustrated in FIG. 2. For the circuits of FIGS. 1 and 2, $Z_{out}=Z_{loop}\approx 135$ ohms, and the transfer function $T(s)=Z_{loop}/(Z_{out}+Z_{loop})=\frac{1}{2}$. Therefore, when there are no taps on the loop, the impedance matching between $Z_{out}$ and $Z_{loop}$ is good, and consequently the output power is maximum, frequency performance distortions are minimum, and there is no phase shift. A further benefit is good echo cancellation in received signals via operation of a hybrid 30.

FIG. 3 illustrates the transformer T and the loop 25 of the circuit of FIG. 1, but with a tap 45 in the loop near the CP end of the loop. For the circuit illustrated in FIG. 3, in the frequency band of interest, which is about 80 KHz to about 400 KHz, the value of $Z_{loop}$ is complex and, for example, will drop to about 20±j20 ohms. $Z_{out}$ remains equal to about 135 ohms. Consequently, the impedances no longer match and power output to the loop is reduced. A simplified schematic diagram of the relationship between $Z_{out}$ and $Z_{loop}$ in this case is illustrated in FIG. 4. The transfer function T(s) is as follows: $T(s)=20\pm j20/((135+(20+j20))$. As a result of the poor impedance matching, the output power drops by a factor of about ten, frequency performance distortions are relatively high, there is phase shift distortion, and the echo of the transmitted signal is inadequately removed from signals received from the loop. Thus, the performance of the circuit of FIG. 1 is maximally efficient without taps in the loop, because, due to the fixed values of R1 and RL2, the circuit is optimized for only one value of $Z_{loop}$. In practice, the value of $Z_{loop}$ may vary from one loop to another, and there is a need for an interface that automatically matches its output impedance $Z_{out}$ to the impedances of various loops, for example the ten loops defined by the ANSI standard.

A collateral problem with full-duplex communication over a loop is that the transmitted signal's echo (TE) becomes mixed with the signal received from the loop. Line interfaces typically have a line coupling transformer, for coupling the signal to be transmitted into the loop. The line coupling transformer will typically have a first winding and a second winding, with the second winding being connected to the loop. A voltage referred to as $V_{echo}$ is present at the first winding. $V_{echo}$ consists of an aggregate of both a received signal and TE. TE may be considerably larger than the received signal. The received signal, therefore, may be significantly corrupted by TE. It is desirable to remove TE from $V_{echo}$ in order to produce a signal that consists of only the received signal. TE is commonly removed from $V_{echo}$ with a subtractor, which subtracts an estimate of TE from $V_{echo}$.

The circuit of FIG. 1 also subtracts an approximation of TE from $V_{echo}$, thereby reducing the amount of TE coexisting with the received signal. To accomplish this, the signal to be transmitted is tapped after the power amplifiers and is input to a hybrid 30. Ideally, the output of the hybrid is an accurate replica of TE, which is subtracted from the aggregate of the received signal and TE.

$V_{echo}$ (amplified at 35) and the output of the hybrid are input into a subtractor 40, where the output of the hybrid is subtracted from the output of the amplifier 35. As a result of the subtraction, TE is removed from the amplified $V_{echo}$ signal to the extent that the output of the hybrid is an accurate replica of TE. However, the output of the hybrid will be an accurate replica of TE only when the input impedance of the loop $Z_{loop}$, equals the value of $Z_{loop}$ used for the design of the hybrid.

SUMMARY OF THE INVENTION

An objective of this invention is to provide a line interface apparatus that automatically matches the output impedance $Z_{out}$ of the apparatus to the loop impedance $Z_{loop}$ of one of several loops with taps that may be coupled to the line interface apparatus, in order to provide for efficient power transfer. Secondary objectives are the reduction of nonlinearities and cancellation of echo signals. The line interface apparatus is for coupling a signal to a loop with taps for transmission. The loop is characterized by the impedance $Z_{loop}$ The line interface apparatus will generally be used in conjunction with, or as part of, a telecommunications device, for example, a modem. The line interface apparatus will typically be used for the transmission and reception of signals over high bit rate digital service lines (HDSL), or the equivalent.

The line interface apparatus includes a line coupling transformer that has first and second windings. The line interface apparatus also includes a variable impedance circuit that is connected to the first winding of the line coupling transformer. The variable impedance circuit includes an impedance that may be selectively and automatically changed to maximize the efficiency with which signal power is coupled to a loop with taps. The variable impedance circuit adjusts the output impedance $Z_{out}$ of the line interface apparatus so that it may match, or substantially equal, the loop impedance $Z_{loop}$ of a loop.

The variable impedance circuit operates by switching impedances into the connection between the output of a transceiver amplifier and the first winding of the line coupling transformer. The impedances may be reactive, or entirely resistive.

The impedances are automatically switched in response to the magnitude of an echo signal detected by the line interface apparatus.

In a first embodiment, the variable impedance circuit includes at least a first reactive section and a second reactive section, wherein the first reactive section is characterized by a first impedance, and the second reactive section that is characterized by a second impedance. The variable impedance circuit further includes a switch circuit that is connected to the first and second reactive sections and to the first winding of the line coupling transformer, for switching either the first or the second reactive section in series with the first winding of the line coupling transformer. The switch circuit includes a switch and a second transformer. The second transformer inductively couples the first or the second reactive section in series with the first winding of the line coupling transformer, depending on the position of a switch arm of the switch.

The line interface apparatus may further include a filter section connected to the variable impedance circuit, in which case the apparatus is referred to as a telecommunications apparatus. The filter section may comprise a high pass filter (HPF) and a low pass filter (LPF). The filter section reduces nonlinearities and crosstalk. The apparatus may further include means for generating signals to be transmitted over the line and receiving signals from the line, in which case the apparatus is referred to as a modem. The means for generating signals can be a signal source.

In the first embodiment, the line interface apparatus automatically determines whether to switch either the first or the second reactive section in series with the first winding of the line coupling transformer. This is accomplished by using a hybrid to produce a replica of TE, and then using a subtractor to subtract the output of the hybrid from a signal generated across the first winding of the line coupling transformer, referred to as $V_{echo}$. $V_{echo}$ comprises a composite of the received signal, and TE.

The output of the hybrid will be an accurate replica of $V_{echo}$ only when $Z_{loop}$ is equal to the value of $Z_{loop}$ used for the design of the hybrid. A value of $Z_{loop}$ similar to the impedance of a group of non-problematic loops is used for the design of the hybrid. Accordingly, the output of the hybrid will be an accurate replica of TE when a non-problematic loop is connected to the second winding of the coupling transformer, and the output of the hybrid will not be an accurate replica of TE when a problematic loop is connected to the second winding of the coupling transformer.

TE has a much larger amplitude than the received signal. Thus, if the output of the hybrid is not an accurate replica of TE, the amplitude of Vs the output of the subtractor will be much greater than if the output of the hybrid is an accurate replica of the TE. This occurs because, if the output of the hybrid is an accurate replica of TE, then TE will be subtracted out in the subtractor, reducing the amplitude of Vs. Accordingly, the magnitude of the output of the subtractor Vs is an indication of whether the output of the hybrid is an accurate replica of TE, which will only occur when $Z_{loop}$ equals the value of $Z_{loop}$ used for the design of the hybrid. The amplitude of Vs therefore indicates the efficiency of power transfer from the line interface apparatus to the loop.

The output Vs of the subtractor is input into a digital signal processor (DSP), where the amplitude of Vs is compared to a threshold value. An output of the DSP is connected to a control input of the switch, to connect the arm of the switch to either the first reactive section or the second reactive section.

The first reactive section is designed to have an impedance characteristic of the problematic loops, and the second reactive section is designed to have an impedance characteristic of the non-problematic loops. The value of $Z_{loop}$ used for the design of the hybrid is representative of the impedances of the non-problematic loops. Thus, when the line interface apparatus is connected to any of the non-problematic loops, the output of the hybrid will be an accurate replica of TE. In this case the output of the subtractor will be less than the threshold value, and signal from the output of the DSP will cause the arm of the switch to be connected to the second reactive section, which causes $Z_{out}$ to be substantially equal to the impedance of any of the non-problematic loops. If the line interface apparatus is connected to any one of the problematic loops, the hybrid will not produce an accurate replica of TE. In this case the output of the subtractor will be at least as great as the threshold value, and the arm of the switch will be connected to the first reactive section, which causes $Z_{out}$ to be substantially equal to the impedance of any of the problematic loops. Thus, $Z_{out}$ is automatically matched to $Z_{loop}$ when the line interface apparatus is connected to either a non-problematic or a problematic loop. This impedance matching results in more efficient power transfer to the loop, reduces nonlinearities, and enhances echo signal cancellation.

In a second embodiment of the invention, the variable impedance circuit includes at least two resistors, one of which is switched into the signal path between the power amplifier and the first winding in response to the DSP output. This embodiment achieves the desired maximization of efficiently, but tolerates inefficient. hybrid operation, with a consequent reduction in the effectiveness of echo cancellation.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Figure 5:
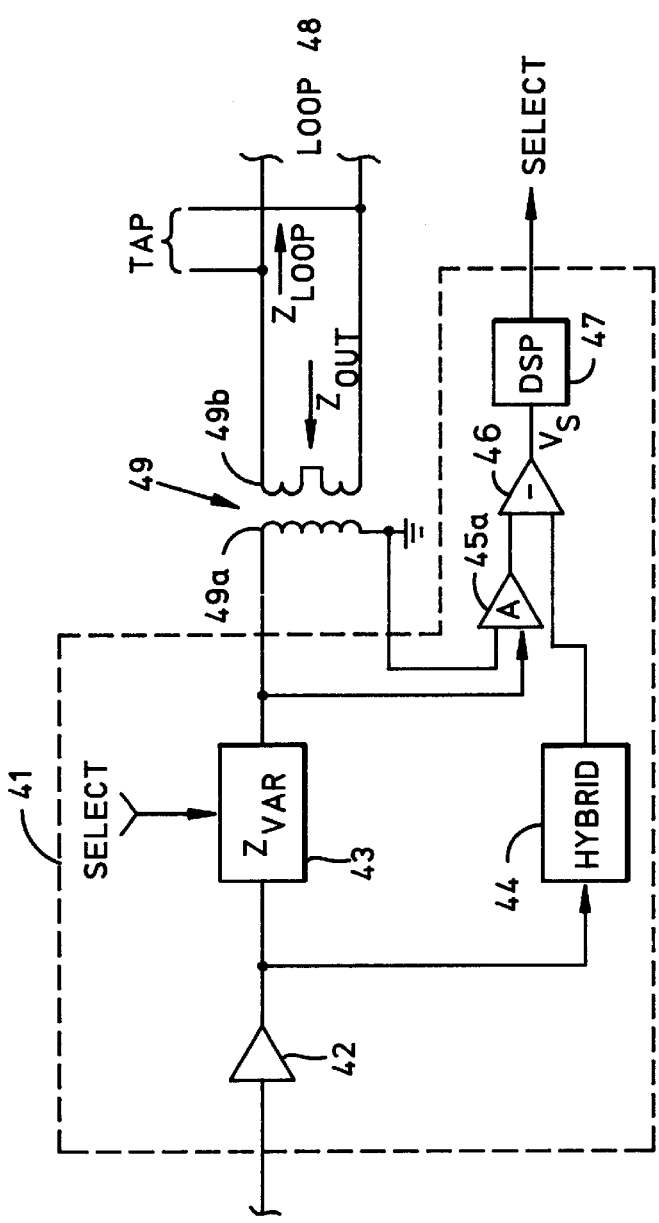
FIG. 5 is a block/schematic diagram of a line interface apparatus that automatically selects an output impedance that will provide efficient transfer of power to a loop with taps.

FIG. 5 is block/schematic diagram of a line interface apparatus that automatically selects an output impedance such that the output impedance will provide efficient transfer of power to a loop with taps. In FIG. 5, a line interface apparatus 41 according to the invention includes a power amplifier 42 that receives a signal to be transmitted, amplifies the signal and provides it to a variable impedance circuit 43 characterized in having a variable impedance $Z_{var}$ that may be selectively and automatically changed in response to a select signal. In the line interface apparatus, a hybrid 44 receives and processes signal that represents the signal that is to be coupled to the loop 48 for transmission thereon. An amplifier 45a is connected to a line coupling transformer 49, also referred to as a loop coupling transformer. The line coupling transformer 49 has a first winding 49a and second winding 49b. Signals produced by the power amplifier 42 are connected through the variable impedance circuit 43 to the first winding 49a. By transformer action, signals to be transmitted are coupled into the loop 48 through the second winding 49b. At the same time, the loop 48 conducts signals to the second winding 49b that are to be received by the line interface circuit through a receiver (not shown) connected to the first winding 49a. Thus the signal present across the first winding 49a is a composite signal having as elements a received signal and a signal referred to as the transmitted signal's echo (TE). The composite signal is amplified by the power amplifier 45a. The outputs of the hybrid 44 and the power amplifier 45a are combined in the subtractor 46. The output of the subtractor, a voltage $V_s$, is provided to a digital signal processor (DSP) 47. The DSP 47 subjects the magnitude of the signal Vs to a threshold. Depending upon the relationship of the magnitude of Vs with the threshold, the DSP 47 decides whether or not power is being efficiently coupled from the line interface apparatus 41 to the loop 48.

It is contemplated that the line interface apparatus 41 is telecommunications equipment that is designed for connection to the customer premises (CP) side of the telecommunications loop. However, it is known that loop configurations may vary widely, so different loops present different loop impedances to the line interface apparatus 41. Particularly troublesome are loops having unloaded taps near the CP side of a telecommunications system. The impedances of such loops may differ from the impedances of less troublesome loops by factors of five or more. Thus, a particularly desirable feature of the line interface apparatus 41 in FIG. 5 is the ability to change the value of $Z_{var}$ in the variable impedance circuit 43. Particularly advantageous is the fact that the impedance is varied automatically in such a way as to more closely match the loop impedance of a loop to which the line interface apparatus 41 is connected. The line interface apparatus 41 may therefore adaptively change its impedance configuration in order to maximize the efficiency with which the power of a transmitted signal is coupled to the loop 48. Since the output of the subtractor 46 indicates the efficiency with which signal power is coupled to the loop 48, the DSP 47 is programmed so that it may decide whether the impedance of the variable impedance circuit 43 must be changed. In this regard, the DSP 47 conditions the select signal to a state that sets $Z_{var}$ to a value that substantially matches the output impedance of the line interface apparatus 41 to the loop impedance of the loop 48.

Figures 6, 7, 8:
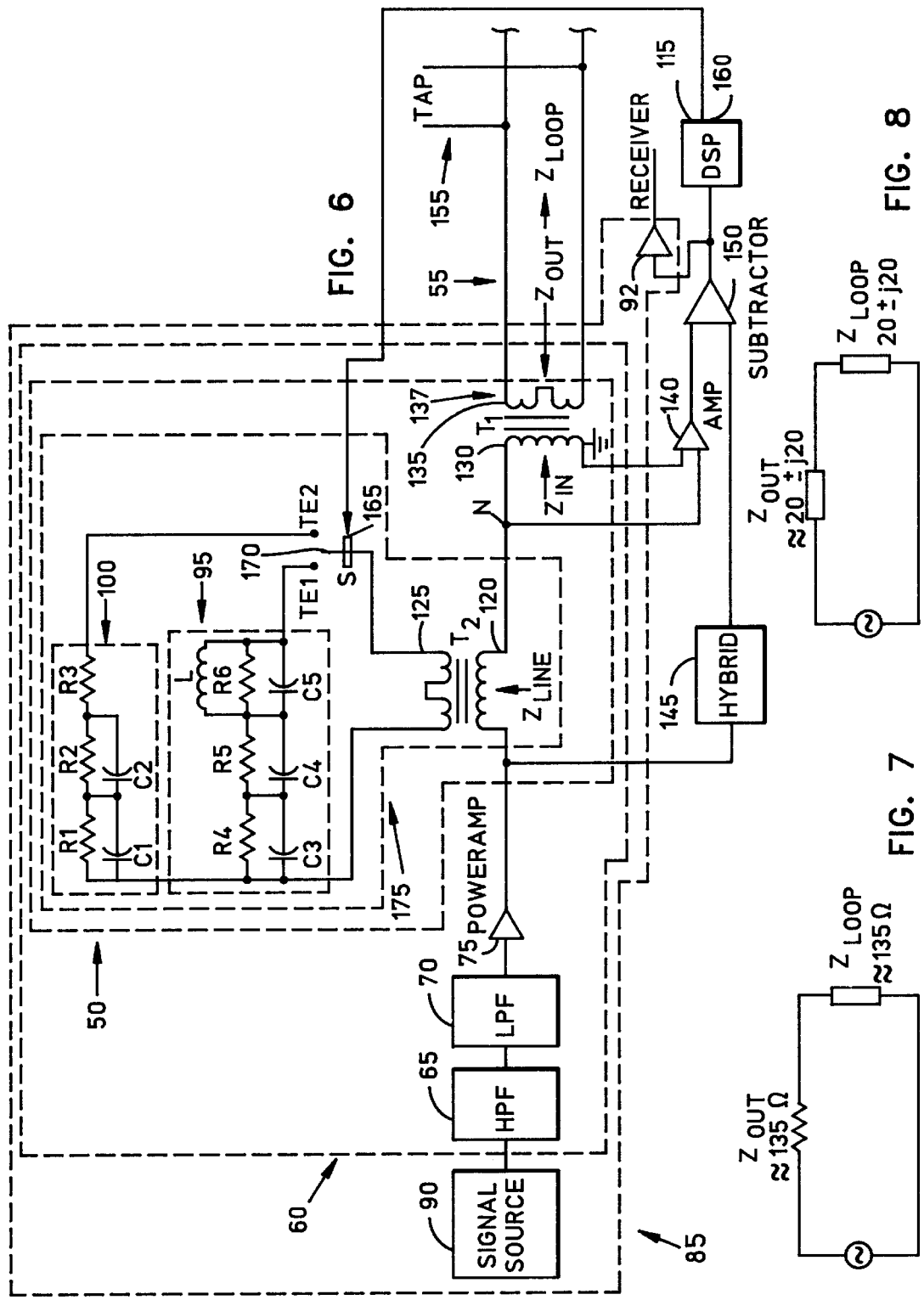
FIG. 6 is a block/schematic diagram of a first embodiment of a line interface circuit that matches the output impedance ($Z_{out}$) of the line interface apparatus with the input impedance ($Z_{loop}$) of a loop.
FIG. 7 is a schematic diagram of a circuit that is representative of the relationship between the output impedance ($Z_{out}$) and loop impedance ($Z_{loop}$), for the circuit of FIG. 6 when the second reactive section is switched in series with the second winding of the second transformer T2.
FIG. 8 is a schematic diagram of a circuit that is representative of the relationship between the output impedance ($Z_{out}$) and loop impedance ($Z_{loop}$), for the circuit of FIG. 6 when the first reactive section is switched in series with the second winding of the second transformer T2.

FIG. 6 illustrates a first embodiment of a line interface apparatus 50, for coupling a signal to a loop 55 with unloaded taps according to the invention. The line interface apparatus 50 automatically matches the output impedance $Z_{out}$ of the line interface with the input impedance $Z_{loop}$ of the loop 55 (which may also be referred to as a transmission line).

The line interface apparatus is intended to be connected to, or to be part of, an electronic device, which will typically be a telecommunications apparatus 60. The line interface apparatus is intended to be connected between the telecommunications apparatus and the loop, to couple signals from the telecommunications apparatus to the loop. The line interface will often be a component of the telecommunications apparatus. The telecommunications apparatus 60 comprises the line interface 50, plus a power amplifier 75, and a filter section which preferably consists of high pass filter (HPF) 65, and a low pass filter (LPF) 70. Alternatively, the filter section could consist of either the HPF or the LPF. The telecommunications apparatus can be any device for sending and/or receiving signals, and preferably is a transceiver. Preferably, the transceiver is a modem 85. If the telecommunications apparatus is a modem or other type of transceiver, the telecommunications apparatus also includes a signal source 90 and a receiver 92.

Although any type of electronic signals could be transmitted and received with the line interface 50, typically the line interface will be used with high bit rate digital service lines (HDSL), or with higher powered HDSL2. Integrated circuits for transmitting and receiving HDSL and HDSL2 signals are available from a number of manufacturers, and any of these integrated circuits could be satisfactorily used. Preferably, the model number Bt8960 integrated circuit chip set, available from Brooktree Corporation, 9868 Scranton Road, San Diego, Calif., is used. The Brooktree publication *Interconnection Information,* regarding the Bt8960 integrated circuit chip set, which is available. from the Brooktree Corporation, is incorporated herein by reference.

Generally, the line interface 50 of FIG. 6 automatically determines when the input impedance $Z_{loop}$ of the loop differs from the output impedance $Z_{out}$ of the line interface, and then automatically employs either a first reactive circuit 95, also referred to as a first reactive section, or a second reactive circuit 100, also referred to as a second reactive section, to match the impedance of the line interface apparatus 50 to the impedance of the loop 55 for efficient transfer of transmitted signal power to the loop 55.

The signal to be transmitted by the modem 85 is obtained from the signal source 90. The signal to be transmitted by either the telecommunications apparatus 60 or the modem 85 passes through the high pass filter (HPF) 65. The HPF is employed to eliminate low frequency components that would otherwise degrade linearity conditions of a first transformer T1.

Figure 2:
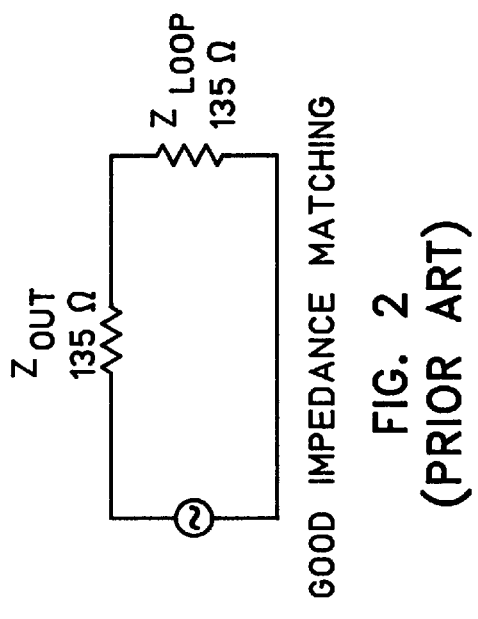
FIG. 2 is a schematic diagram of a circuit that is representative of the relationship between the output impedance ($Z_{out}$) and loop impedance ($Z_{loop}$) for the circuit of FIG. 1, for the case when there are no taps connected to the loop.
Figure 4:
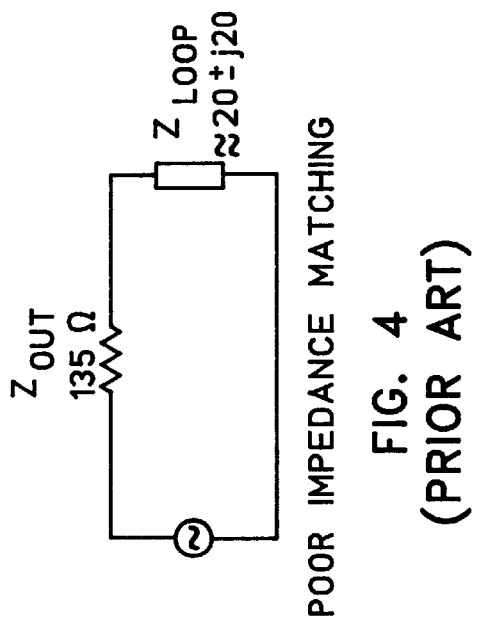
FIG. 4 is a schematic diagram of a circuit that is representative of the relationship between the output impedance ($Z_{out}$) and loop impedance ($Z_{loop}$) for the circuit of FIG. 3.
Figure 1:
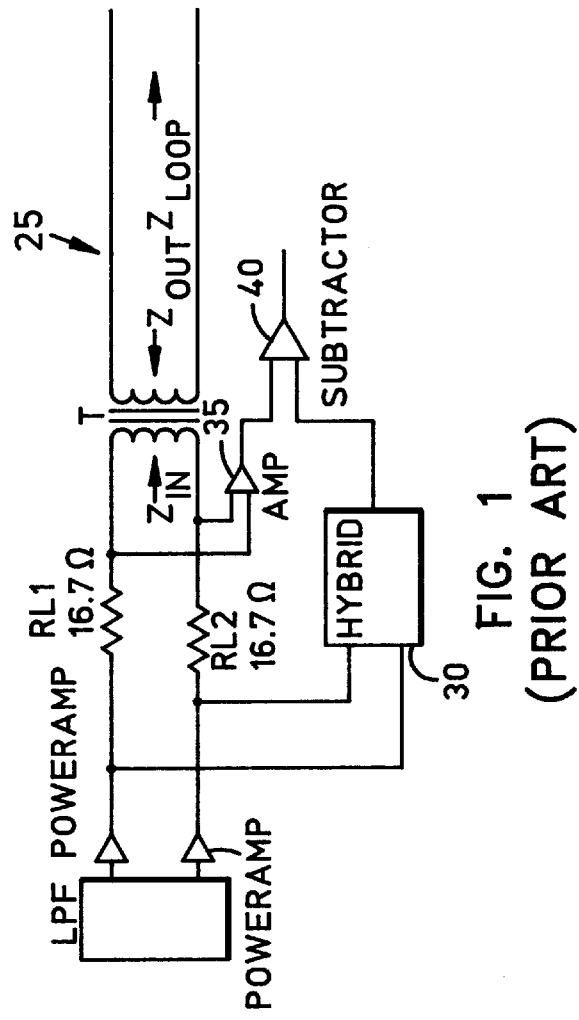
FIG. 1 is a block/schematic diagram of a prior art circuit for coupling signals to a line.
Figure 3:
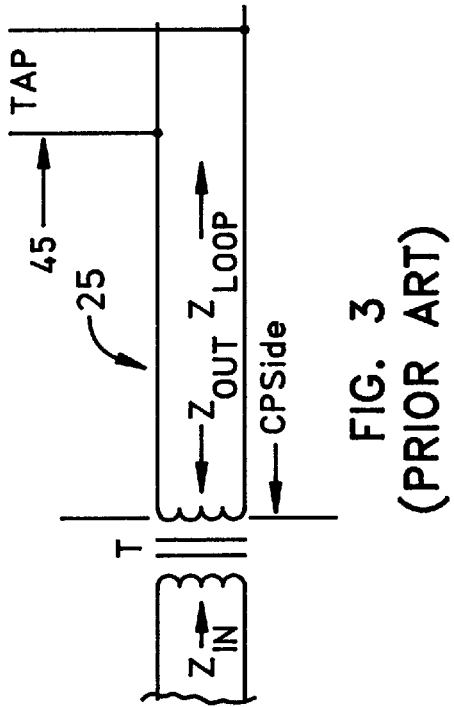
FIG. 3 is a schematic diagram of the transformer T and loop (transmission line) of FIG. 1, but with a tap connected to the loop.

In contrast to the circuit of FIG. 1, a separate HPF is used in the circuit of FIG. 6. In the circuit of FIG. 1, the resistors RL1 and RL2, along with the effective inductance of the primary of transformer T act as a high pass filter for the low frequency portion of the HDSL signal spectrum. The resistors RL1 and RL2 are not used in the circuit of FIG. 6, which necessitates the use of the HPF. However, it is beneficial to use the discrete HPF, because in that case the characteristics of the first transformer T1 in FIG. 5 can be optimized for the efficient transfer of signals rather than as a compromise between signal transfer performance and high pass filter performance. The HPF is typically implemented with a first order RC filter, although any type of high pass filter could be used.

The circuit of FIG. 1 is illustrated with a pair of differential signal lines. Except for the loop 55, the circuit of FIG. 6, is illustrated with a single signal line. However, the line interface 50, the telecommunications apparatus 60 and/or the modem 85 of FIG. 6 can be implemented with either a single signal line, or with a pair of differential signal lines.

In addition to passing through the HPF 65, the signals to be coupled to the loop 55 and transmitted thereby also pass through a low pass filter (LPF) 70, which can be located in the signal chain either before or after the HPF. The LPF rejects signals in the high frequency portion of the HDSL signal spectrum, in order to reduce crosstalk. The LPF is usually a first order RC filter, although any type of low pass filter could be used.

After filtering, the signals to be transmitted are then amplified by the power amplifier 75. The power amplifier can be any appropriate amplifier, and preferably will be a power amplifier on the HDSL chip set. The signal outputted from the power amplifier then passes though a first winding 120 of a second transformer T2 in the line interface 50. The transformer T2 is utilized for impedance matching. The function of the transformer T2 and the circuitry connected to a second winding 125 of transformer T2 will be discussed in detail later in this description. The signal to be transmitted then passes through a first winding 130 of the transformer T1, and is inductively coupled to a second winding 135 of the transformer T1 and into the loop 55. The two ends of the second winding 135 of the first transformer T1 are an input/output 137 of the line interface apparatus 50. In operation, a remote transmitter (not shown) is connected to the remote end of the loop to receive the signals transmitted from the interface.

Preferably, the ratio of the number of turns of the second winding to the number of turns of the first winding of the transformers T1 and T2 is two to one. Preferably the transformer T1 and the transformer T2 are identical. However, the circuit of FIG. 6 can be implemented with nonidentical transformers, if the impedance values of the first reactive circuit 95 and the second reactive circuit 100, which are selectively connected to the second winding 125 of the transformer T2, are adjusted accordingly. The transformers T1 and T2 may also be referred to respectively as first and second coupling means, with the first and second windings of each transformer corresponding respectively with the input and output of each respective coupling means. The transformer T1 may also be referred to as a line coupling transformer. The first and second windings of the transformers T1 and T2 may also be referred to respectively as the inputs and outputs of the transformers. Preferably, both the transformer T1 and the transformer T2 are model number 671-7926, available from Midcom. One or both of the coupling means may be a transformer, an electro-optical coupler or any other device capable of coupling signals.

In addition to transmitting signals, the line interface apparatus 50 is also designed for receiving signals. The signals to be received are transmitted from a remote transmitter (not shown) and are propagated along the loop 55. These signals are then inductively coupled from the second winding 135 of the transformer T1, to the first winding 130 of the transformer T1. These signals are then amplified by an amplifier 140. Amplifier 140 is preferably an amplifier included on the HDSL chip set, although any appropriate amplifier could be used. After passing through a subtractor 150, which is discussed below, these signals are then inputted into the receiver 92. Preferably, the receiver is a receiver on the HDSL chip set, although other receivers known in the art could be used.

As a result of the presence of the signal to be transmitted, a signal referred to as the transmitted signal's echo (TE) is present across the first winding of the transformer T1. The received signal and TE together comprise $V_{echo}$, which is present across the first winding of the transformer T1. $V_{echo}$ is amplified by the amplifier 140. Thus, the output of the amplifier 140 is an aggregate of the received signal and TE. To improve the quality of the received signal, it is desirable to remove as much of the effect of TE as possible.

In order to remove TE from the signal at the output of the amplifier 140, an approximation of TE is subtracted from the signal. To accomplish this, the signal at the output of the power amplifier 75 is tapped and inputted into a hybrid 145. It is desirable that the output of the hybrid be an accurate replica of TE in order to cancel TE from the received signal. This desirable condition results only if the transfer function TH(s) of the hybrid 145 equals the transfer function T(s) from the output of the power amplifier 75 to a node N. The output of the amplifier 140, which is an aggregate of the received signal and TE, and the output of the hybrid 145, are inputted into the subtractor 150. The subtractor subtracts the output of the hybrid 145 from the output of the amplifier 140, rendering an output signal Vs that is cleansed of TE to the extent that the output of the hybrid accurately replicates TE. The subtractor can be implemented with any analog subtractor, or its equivalent, that is capable of accomplishing the subtraction function. Preferably, the subtractor is an op-amp.

As discussed above, the output of the hybrid will be an accurate replica of TE if the transfer function TH(s) of the hybrid 145 equals the transfer function T(s) from the output of the power amplifier 75 to the node N. The transfer function T(s) is a function of $Z_{loop}$. Thus, T(s) changes if $Z_{loop}$ changes. Accordingly, even though the hybrid may be designed so that the transfer function of the hybrid TH(s) equals the transfer function T(s) for a particular value of $Z_{loop}$, TH(s) will not equal T(s) if $Z_{loop}$ has a value that is different than the value of $Z_{loop}$ implicit in the hybrid. It follows that the output of the hybrid 145 will be an accurate replica of TE only when $Z_{loop}$ equals the value of $Z_{loop}$ used for designing the hybrid.

For the circuit of FIG. 6, the hybrid is designed for a particular value of $Z_{loop}$ based upon a particular configuration of the loop 55. Assume that the hybrid 55 is designed for one of the "non-problematic" loops. Thus, when the line interface 50 is connected to a loop 55 having that configuration, the output of the hybrid 145 will be an accurate replica of TE, and the output of the subtractor 150 will be the received signal without TE. However, when the loop 55 has a configuration with one or more unloaded taps, such as the tap 155, near a customer premise (CP) where the line interface apparatus 50 is installed, the value of $Z_{loop}$ will differ from the value of $Z_{loop}$ for the loop configuration for which the hybrid is designed. Consequently, in this case, the output of the hybrid will not be an accurate replica of TE, with the result that echo cancellation will be degraded.

The ten loop configurations defined by the cited ANSI standard can be divided into two groups: a problematic group and a non-problematic group. Loop configurations one, three, four, five, six, eight, and ten comprise the non-problematic group, and may exhibit loop impedances of, for example, 110 ohms. Loop configurations two, seven, and nine comprise the problematic group. For these loops, which have taps near the CP side $Z_{loop}$ becomes complex in the main frequency range of HDSL (80 KHZ–400 KHZ) and the values of $Z_{loop}$ drop to, for example (20±j 20) ohms. In practice the non-problematic loops are non-problematic because the transfer function of the hybrid 145 is designed for the case when $Z_{loop}$ is substantially equal to the impedance of the loop configuration with no taps, which is similar to the impedance of all of the non-problematic loops. Thus, the output of the hybrid 145 is an accurate replica of TE when one of the non-problematic loops is connected to the second winding 135 of transformer T1. On the other hand, the characteristic impedances of the problematic loop configurations materially differ from the impedance of the non-problematic loops. Consequently, the output of the hybrid is not a good replica of TE when the second winding of transformer T1 is connected to one of the problematic loops.

When the output of the hybrid 145 is not a good replica of TE, the output Vs of the subtractor 150 significantly increases in amplitude compared to the output of the subtractor when the output of the hybrid is a good replica of TE. The change in amplitude of Vs can be on the order of two to one. This occurs because TE, which generally will have a much greater amplitude than the received signal, will be present at the output of the subtractor when the output of the hybrid is not a good replica of TE. As discussed above, the output of the hybrid will be an accurate replica of TE when the second winding 135 of transformer T1 is connected to one of the non-problematic loops, and will be a poor replica of TE when the second winding of transformer T1 is connected to one of the problematic loops. It follows that an increase in the amplitude of the output of the subtractor Vs is indicative that the second winding of transformer T1 is connected to one of the problematic loops, for which $Z_{out}$ does not equal $Z_{loop}$.

The magnitude of $V_{echo}$ will decrease when $Z_{out}$ does not equal $Z_{loop}$. This occurs because of an impedance mismatch due, for example, to a decrease in $Z_{loop}$, which will cause a decrease in $Z_{in}$, the input impedance of the first transformer T1. Thus, the output of the subtractor is also indicative of whether $Z_{loop}$ is equal to a baseline value. The baseline value is a value of $Z_{loop}$ representative of the loop impedance of the non-problematic loops.

The output Vs of the subtractor 150 is connected to an input of the digital signal processor (DSP) 115. The DSP detects and indicates when the amplitude of the output of the subtractor Vs is greater than or equal to the threshold value. The threshold value can be any value that is empirically or otherwise determined to be appropriate for determining whether a problematic or non-problematic loop is connected to the input/output 137 of the line interface 50. When the amplitude of Vs is greater than or equal to the threshold value, it is indicative that the output. impedance $Z_{out}$ does not equal $Z_{loop}$. Rather than using a DSP, alternatively, the functions of the DSP discussed herein could be implemented with analog circuitry, for example with a comparator. Alternatively, these functions of the DSP could be implemented with a combination of analog and digital circuitry. As another alternative, discrete digital logic elements or a custom large scale integration integrated circuit could be used to implement these functions of the DSP. The DSP may be any type of digital processing unit, for example a microprocessor, a microcontroller, a plug in card in a personal computer, a personal computer, or a larger computer.

Coupling Efficiency

In response to a signal from the DSP 115 indicating that $Z_{out}$ does not equal $Z_{loop}$, the circuit of FIG. 6 changes the value of $Z_{out}$ so that it will substantially equal $Z_{loop}$. With these two impedances substantially equal, the transfer of power to the loop will be maximized and the efficiency of the operation of the line interface will be increased. This is accomplished by using a signal from an output 160 of the DSP 115 to control a switch S, which controls the value of $Z_{out}$. The output signal from the DSP is indicative of whether the amplitude of the output of the subtractor 150 is, on one hand, greater than or equal to the threshold value, or on the other hand, less than the threshold value. The output 160 of the DSP is connected to a control input 165 of switch S, to control the position of the switch arm 170. It is not necessary for the switch S to be a high speed switch. The switch can be any, switch capable of being controlled by the DSP. The switch arm 170 is connected to a first terminal TE1 when the output signal from the DSP 115 indicates that the output of the subtractor 150 is greater than or equal to the threshold value, and the switch arm is connected to a second terminal TE2 when the output signal from the DSP indicates that the output of the subtractor is less than the threshold value. The switch arm 170 is also connected to an end of the second winding 125 of the second transformer T2. The first reactive circuit, the second reactive circuit, and a switch circuit comprising the switch S and the second transformer T2, may collectively be referred to as an impedance matching circuit 175. The switch circuit is connected to the first winding of the first transformer T1, and is selectively connected to either the first reactive circuit or the second reactive circuit.

When the arm 170 of switch S is connected to the first terminal TE1, the first reactive circuit 95 is connected in series with the second winding 125 of the second transformer T2. The impedance of the first reactive circuit 95 is designed to generally model the impedance of loops two, seven, and nine. Although loops two, seven, and nine have different impedances, the impedance of the first reactive circuit is chosen to generally approximate all three impedances. Similarly, when the arm 170 of switch S is connected to the second terminal TE2, the second reactive circuit 100 is switched in series with the second winding 125 of the second transformer T2. The impedance of the second reactive circuit 100 is designed to generally model the reactance of loops one, three, four, five, six, eight, and ten.

Depending on the position of the switch arm 170, through the inductive coupling of the second transformer T2, either the first reactive circuit or the second reactive circuit is effectively switched in series between the output of the power amplifier 75, and the first winding 130 of the first transformer T1, thereby presenting respectively either a first impedance or a second impedance in series with the first winding of the first transformer T1. This is the case because $Z_{line}$, the output impedance across the first winding 120 of the second transformer T2 is equal to either the first impedance or the second impedance, depending upon the position of the switch arm 170. Given that $Z_{loop}$ is about equal to the impedance of the first reactive circuit when the first reactive circuit is switched into the circuit, or is about equal to the impedance of the second reactive circuit when the second reactive circuit is switched into the circuit, according to fundamental electronic, principles, $Z_{in}$ is about equal to $Z_{line}$, and consequently $Z_{out}$ is about equal to $Z_{loop}$. Therefore, by changing $Z_{line}$ by changing the position of the switch arm 170, $Z_{out}$ can be made to approximately match the impedance of either the non-problematic loops or the problematic loops.

An important benefit of approximately matching the value of $Z_{out}$ to the value of $Z_{loop}$ is that power is more efficiently transferred into the loop. Another beneficial result of matching the impedances is that nonlinear products in general are removed or canceled. Another benefit is that signal echoes are reduced. Further, as a result of the series connection of the first windings 120 and 130 of the two transformers T1 and T2, nonlinearities generated by the transformers are also eliminated. Removal of the nonlinearities is even more important with HDSL2 than HDSL, due to the higher signal levels used in HDSL2.

As illustrated in FIG. 6, the first reactive circuit 95 comprises capacitors C3, C4 and C5, resistors R4, R5, and R6, and inductor L. Capacitor C5 is connected in parallel with resistor R6 and inductor L. A first end of those components is connected to the first terminal TE1. A second end of those components is connected to a first end of capacitor C4 and resistor R5, which are connected in parallel. A second end of capacitor C4 and resistor R5 is connected to a first end of a capacitor C3 and a resistor R4, which are connected in parallel. A second end of capacitor C3 and resistor R4 is connected to one end of the second winding 125 of the second transformer T2. Switch S is connected to the other end of the second winding of transformer T2. Alternatively, the first reactive circuit can be any circuit having the required impedance.

The second reactive circuit 100 comprises capacitors C1 and C2, and resistors R1, R2, and R3. A first end of resistor R3 is connected to the second terminal TE2. A second end of resistor R3 is connected to a first end of capacitor C2 and a first end of a resistor R2, which are connected in parallel. A second end of capacitor C2 and resistor R2 it connected to a first end of a capacitor C1 and a resistor R1, which are connected in parallel. A second end of capacitor C1 and resistor R1 is connected to the second end of the second winding of second transformer T2. Alternatively, the second reactive circuit can be any circuit having the required impedance.

Values of the components in the first and second reactive circuits 95 and 100 are listed in Table 1 of the Appendix. These components have values about equal to the values in Table 1. Table 2A in the appendix lists impedance values for the first reactive circuit 95 and the second reactive circuit 100 at a number of frequencies fi of interest.

Additional reactive circuits, also referred to as reactive sections, could be included. Each reactive circuit would have a unique impedance. These one or more additional reactive circuits could be connected to the switch and the second transformer T2 similarly to the connections of the first and second reactive circuits. This would require the use of a switch having capacity for the additional connections. This would also require configuring the DSP to differentiate between multiple thresholds, and would require the DSP to be able to control the multiple possible switch connections. Employing one or more additional reactive circuits would permit for dividing the loops into smaller groups, resulting in each reactive circuit being a closer approximation of a representative impedance of a group of loops.

Generally, $Z_{loop}=R+jX$. For the circuit illustrated in FIG. 6, when one of the non-problematic loops is connected to the input/output 137 of the line interface 50, the impedance of the second reactive circuit 100 is designed to be about equal to the impedance of $Z_{loop}$ in the frequency band of interest, which is about 80 kHz to about 400 kHz. A representative value of the impedance in this case is about 135 ohms. A simplified schematic diagram of the relationship between $Z_{out}$ and $Z_{loop}$ when a non-problematic loop is connected to the input/output 137 of the interface 50, and when the second reactive circuit 100 is switched in series with the second winding 125 of the second transformer T2, is illustrated in FIG. 7. Using the representative impedance of 135 ohms discussed above, $Z_{out} \approx Z_{loop} \approx 135$ ohms, and the transfer function $T(s)=Z_{loop}/(Z_{out}+Z_{loop}) \approx 1/2$. Therefore, as a result of the use of the second reactive circuit 100, the impedance matching between $Z_{out}$ and $Z_{loop}$ is good, and consequently, the output power is maximum, frequency performance distortions are reduced, there is little or no phase shift, and signal echoes are reduced.

When one of the problematic loops is connected to the input/output 137 of the line interface 50, the impedance of the first reactive circuit 95 is designed to be about equal to the impedance of $Z_{loop}$ in the frequency band of interest, which is about 80 kHz to about 400 kHz. A representative value of the impedance in this case is about $20 \pm j20$. A simplified schematic diagram of the relationship between $Z_{out}$ and $Z_{loop}$ when a problematic loop is connected to the input/output 137 of the interface 50, and when the first reactive circuit 95 is switched in series with the second winding 125 of the second transformer T2, is illustrated in FIG. 8. Using the representative impedance of 20±j20 discussed above, $Z_{out} \approx Z_{loop} \approx 20 \pm j20$, and the transfer function $T(s)=Z_{loop}/(Z_{out}+Z_{loop}) \approx \frac{1}{2}$. Therefore, as a result of the use of the first reactive circuit 95, the impedance matching between $Z_{out}$ and $Z_{loop}$ is remains good, and consequently, the output power is maximum, frequency performance distortions are reduced, there is little or no phase shift, and signal echoes are reduced.

Figure 9:
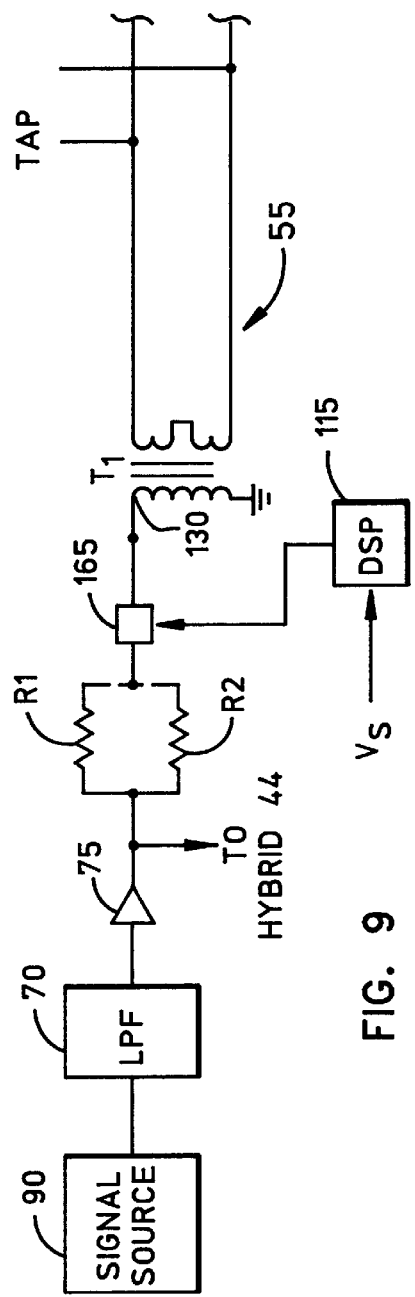
FIG. 9 is a block/schematic diagram of a second embodiment of the line interface circuit that matches the output resistance ($R_{out}$) of the line interface apparatus with the input resistance ($R_{loop}$) of a loop.

FIG. 9 illustrates a second embodiment of the invention in the form of a line interface apparatus having a variable impedance circuit with two (R1 and R2) or more resistors that are individually selectable by the switch 165. Although any number of resistors can be used, preferably four resistors are used. These resistors can have any functionally appropriate values. Preferably the values of the resistors will be from about 10 ohms to about 40 ohms. The line interface apparatus of FIG. 9 operates identically with the line interface apparatus of FIG. 6 with three exceptions. First, instead of automatically selecting a reactive circuit for series connection between the output of the power amplifier 75 and the first winding 130 of the transformer T1, a resistance is selectively switched therebetween. Second, the resistance switched in series with the primary winding 130 performs the HPF function of removal of low frequency components from the transmitted signal thereby eliminating the need for the HPF 65 of the first embodiment. Third, the second transformer T2 is eliminated, thereby enhancing the simplicity and reducing the cost of the line interface apparatus. Although effective at selectively maintaining a high efficiency of power transfer from the line interface apparatus to the loop, the second embodiment illustrated in FIG. 9 does impose a penalty. In this regard, if the structure of the hybrid 44 is fixed, the absence of a reactive component in the impedance of the variable impedance circuit will degrade the echo cancellation function of the hybrid 44. This necessarily implies a trade-off in choosing the first or second embodiments of the invention for any particular implementation.

Method

Figure 10:
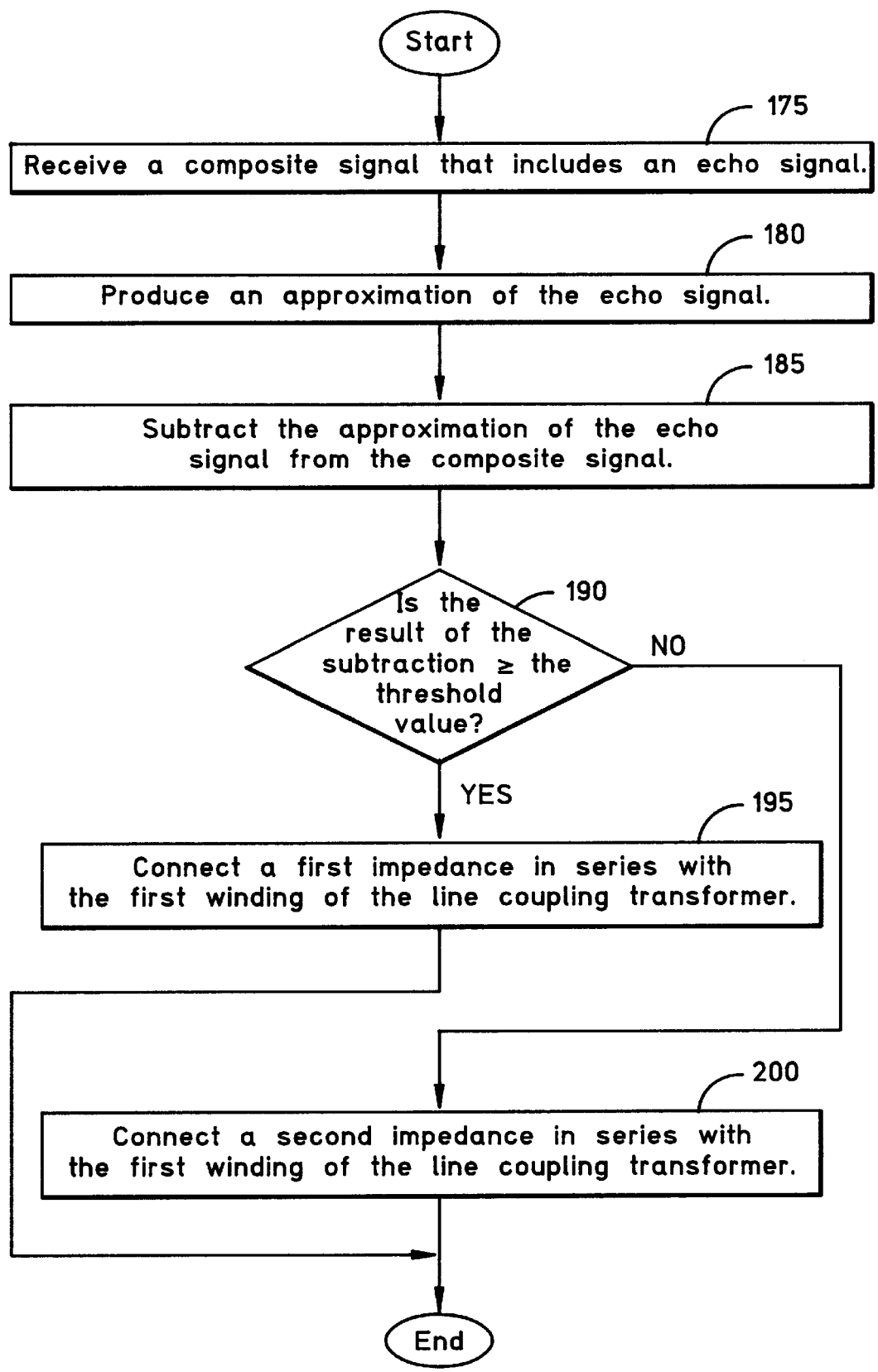
FIG. 10 is a flow chart illustrating a method for matching the output impedance ($Z_{out}$) of a line interface with the input impedance ($Z_{loop}$) of a loop.

FIG. 10 is a flow chart illustrating a method for matching $Z_{out}$ to $Z_{loop}$. The method includes receiving a composite signal that includes a signal echo of a transmitted signal, which is illustrated by box 175 in FIG. 10. The composite signal is an aggregate of the received signal and the echo signal (TE). The composite signal is received at the first winding 130 of the first transformer T1. The composite signal is inputted into the amplifier 140, which amplifies the composite signal. As illustrated by box 180, an approximation of the echo signal is also produced. The approximation of the echo signal is produced by tapping the signal to be transmitted at the output of the power amplifier 75, and inputting that signal into the hybrid 145. The output of the hybrid will be an accurate replica of the echo signal only when $Z_{loop}$ equals the impedance value used for $Z_{loop}$ during the design of the hybrid. The output of the amplifier 140 and the output of the hybrid 145 are inputted into the subtractor 150, which subtracts the approximation of the echo signal from the composite signal, which is illustrated by box 185.

The output Vs of the subtractor 150 is inputted into the DSP 115. As illustrated by decision box 190, in the DSP the output Vs of the subtractor is compared to a threshold value. If the output Vs of the subtractor is greater than or equal to the threshold value, the signal from the output 160 of the DSP causes the switch S to connect a first impedance in series with the second winding 125 of the second transformer T2. If the output Vs of the subtractor is less than the threshold value, a second impedance is connected in series with the second winding 125 of the second transformer T2. If the first impedance is connected to the second winding 125, then, according to fundamental electronic principles, $Z_{line}$ has a first value. if the second impedance is connected to the second winding 125, then $Z_{line}$ has a second value. Accordingly, when the output Vs of the subtractor is greater than or

TABLE 1

Values of the components in the first and second reactive circuits of FIG. 6.

| | |
|---|---|
| R1 = | 50 ohms |
| R2 = | 619 ohms |
| R3 = | 102 ohms |
| R4 = | 392 ohms |
| R5 = | 63.4 ohms |
| R6 = | 60 ohms |
| C1 = | 0.1 µF |
| C2 = | 86 nF |
| C3 = | 66 nF |
| C4 = | 16.8 nF |
| C5 = | 5.6 nF |
| L = | 15 µH |

TABLE 2A

| Z Second Reactive Circuit; | | Z First Reactive Circuit: | | $f_i$ |
|---|---|---|---|---|
| 170.74966 | 178.22301i | 198.29771 | 184.17623i | 10000 |
| 119.2387 | 142.50385i | 166.5654 | 137.94233i | 15000 |
| 96.22388 | 116.6019i | 151.37775 | 113.03327i | 20000 |
| 76.89463 | 86.54391i | 134.56655 | 86.03752i | 30000 |
| 63.2352 | 61.86599i | 118.6253 | 59.53183i | 50000 |
| 55.73481 | 51.91713i | 111.69446 | 45.23016i | 70000 |
| 46.80916 | 43.83078i | 107.15278 | 32.94114i | 100000 |
| 35.8893 | 33.40209i | 104.40037 | 22.48581i | 150000 |
| 30.04093 | 23.23301i | 103.37352 | 17.01228i | 200000 |
| 28.6901 | 14.59828i | 102.92214 | 13.94079i | 245000 |
| 29.46224 | 9.89169i | 102.75028 | 12.57523i | 272000 |
| 31.42197 | 5.56406i | 102.6181 | 11.41429i | 300000 |
| 62.5433 | 9.74663i | 102.22396 | 6.8714i | 500000 |

TABLE 2B

| Zinloop6$_i$ | | Zinloop2$_i$ | | $f_i$ |
|---|---|---|---|---|
| 214.850073564 | 200.067050847i | 173.5754 | 188.4611i | 10000 |
| 182.767746216 | 150.819583319i | 140.1183 | 144.0962i | 15000 |
| 166.401445573 | 125.133535823i | 125.1124 | 121.7854i | 20000 |
| 146.355473155 | 97.414030762i | 106.3979 | 102.9938i | 30000 |
| 127.124548717 | 67.384487936i | 76.0896 | 84.5503i | 50000 |
| 119.257242571 | 52.112099625i | 59.2181 | 67.4285i | 70000 |
| 113.583512558 | 39.106158487i | 49.8894 | 51.9428i | 100000 |
| 109.583356779 | 28.273916145i | 30.2943 | 38.1396i | 150000 |
| 107.803683742 | 22.808869883i | 24.1487 | 16.1525i | 200000 |
| 106.69749241 | 19.914320475i | 26.7065 | 0.96i | 245000 |
| 106.284494256 | 18.536311067i | 31.9632 | 9.7208i | 272000 |
| 105.912443297 | 17.344081959i | 40.5737 | 16.3097i | 300000 |
| 103.891889381 | 12.914588591i | 72.1717 | 17.4036i | 500000 |

TABLE 2C

| Zinloop7$_i$ | | Zinloop9$_i$ | | $f_i$ |
|---|---|---|---|---|
| 466.6089 | 288.7588i | 553.009909 | 405.048456i | 2000 |
| 348.9877 | 293.8733i | 396.024406 | 384.658772i | 3000 |
| 224.0636 | 243.6308i | 250.860478 | 300.200796i | 5000 |

TABLE 2C-continued

| Zinloop7$_i$ | | Zinloop9$_i$ | | f$_i$ |
|---|---|---|---|---|
| 171.6599 | 197.352i | 194.336427 | 239.820177i | 7000 |
| 138.2434 | 153.4682i | 157.375216 | 187.016176i | 10000 |
| 116.3846 | 116.9988i | 129.698225 | 143.620207i | 15000 |
| 104.7888 | 99.659i | 113.636338 | 120.552461i | 20000 |
| 88.1781 | 82.3465i | 94.35924 | 93.892371i | 30000 |
| 70.1931 | 65.2889i | 78.397049 | 67.900769i | 50000 |
| 56.9845 | 57.4925i | 71.211947 | 57.129307i | 70000 |
| 40.4209 | 47.2914i | 63.541995 | 51.547598i | 100000 |
| 22.6659 | 23.7008i | 46.974764 | 48.668445i | 150000 |
| 23.4617 | 2.8975i | 29.31582 | 38.747409i | 200000 |
| 38.2502 | 18.6685i | 19.400485 | 23.967738i | 245000 |
| 49.1858 | 21.4573i | 16.921838 | 14.606133i | 272000 |
| 62.0409 | 19.6182i | 16.816521 | 3.976893i | 300000 |
| 43.9751 | 26.8807i | 63.602177 | 23.435995i | 500000 |
| 66.1893 | 15.0335i | 40.819695 | 28.391401i | 800000 | equal to the threshold value, the first impedance is effectively connected in series with the first winding 130 of the first transformer T1, which is also referred to as the line coupling transformer, as illustrated by box 195. Similarly, when the output Vs of the subtractor is less than the threshold value, the second impedance is effectively connected in series with the with the first winding 130 of the first transformer T1, as illustrated by box 200.

While the above detailed description has shown, described and pointed out the fundamental novel features of the invention as applied to various embodiments, it will be understood that various omissions and substitutions and changes in the form and details of the apparatus and method may be made by those skilled in the art, without departing from the spirit and scope of the claimed invention.

What is claimed is:

1. An apparatus for coupling a signal to a transmission loop, the loop characterized by an impedance $Z_{loop}$, the apparatus comprising:
   a line coupling transformer with first and second windings;
   an amplifier; and
   an impedance matching circuit connected to the first winding of the coupling transformer and to the output of the amplifier, the impedance matching circuit including:
   a first section characterized by a first impedance;
   a second section characterized by a second impedance, and
   a switch circuit connected to the first and second sections, to the amplifier and to the first winding for switching either the first or the second section in series between the amplifier and the first winding.

2. The apparatus of claim 1 wherein the first section is a first reactive section that comprises the parallel combination of a resistor R4 and a capacitor C3 connected in series with the parallel combination of a resistor R5 and a capacitor C4 connected in series with the parallel combination of an inductor L and a resistor R6 and a capacitor C5.

3. The apparatus of claim 1 wherein the second section is a second reactive section that comprises the parallel combination of a resistor R1 and a capacitor C1 connected in series with the parallel combination of a resistor R2 and a capacitor C2 connected in series with a resistor R3.

4. The apparatus of claim 1 for coupling to problematic loops wherein the first section has an impedance that is about equal to the impedance of a problematic loop.

5. The apparatus of claim 1 for coupling to non-problematic loops wherein the second section has an impedance that is about equal to the impedance of a non-problematic loop.

6. The apparatus of claim 1 wherein the switch circuit comprises a switch and a second transformer.

7. The apparatus of claim 6 further comprising a hybrid electrically connected to the second transformer.

8. The apparatus of claim 1 wherein the impedance matching circuit further comprises at least one additional section, with each additional section being characterized by a unique impedance.

9. The apparatus of claim 1 further comprising a high pass filter and a low pass filter coupled with the first winding of the line coupling transformer.

10. A telecommunications apparatus for coupling a signal to a line for transmission, the line characterized by an impedance $Z_{loop}$, the telecommunications apparatus comprising:
    a line coupling transformer with first and second windings;
    an amplifier;
    an impedance matching circuit connected to the amplifier and to the first winding of the line coupling transformer, the impedance matching circuit including:
    a first section characterized by a first impedance;
    a second section characterized by a second impedance; and
    a switch circuit connected to the first and second sections, to the amplifier, and to the first winding for switching either the first or the second section in series between the amplifier and the first winding; and
    a filter section coupled with the impedance matching circuit.

11. A modem for transmitting and receiving signals over a line characterized by an impedance $Z_{loop}$, the modem comprising:
    a line coupling transformer with first and second windings;
    an amplifier;
    an impedance matching circuit connected to the amplifier and the first winding of the line coupling transformer, the impedance matching circuit including:
    a first section characterized by a first impedance;
    a second section characterized by a second impedance; and
    a switch circuit connected to the first and second sections, to the amplifier, and to the first winding for switching either the first or the second reactive section in series between the amplifier and the first winding;
    a filter section connected to the input of the amplifier;
    means connected to the filter section for generating signals to be transmitted over the line; and
    means for receiving signals from the line.

12. A line interface, comprising:
    first coupling means having an input and an output, the output of the first coupling means being connected to a loop;
    second coupling means having an input and an output, the input of the second coupling means being connected with the input of the first coupling means;
    a first impedance circuit selectively connectable to the output of the second coupling means, the impedance of the first impedance circuit being representative of the loop impedance of at least a first loop;

a second impedance circuit selectively connectable to the output of the second coupling means, the impedance of the second impedance circuit being representative of the loop impedance of at least a second loop;

means connected to the first coupling means for measuring the magnitude of an echo signal; and means for connecting the first impedance circuit to the output of the second coupling means when the echo signal has a magnitude that is at least as great as a threshold magnitude, and for connecting the second impedance circuit to the output of the second coupling means when the magnitude of the echo signal is less than the threshold magnitude.

13. A line interface, comprising:

first coupling means having an input and an output, the output of the first coupling means being connected to a loop with one or more taps;

second coupling means having an input and an output, the input of the second coupling means being connected with the input of the first coupling means;

a first impedance circuit selectively connectable to the output of the second coupling means, the impedance of the first impedance circuit being representative of the loop impedance of at least a first loop;

a second impedance circuit selectively connectable to the output of the second coupling means, the impedance of the second impedance circuit being representative of the loop impedance of at least a second loop;

means for detecting when the impedance of the input of the first coupling means is not substantially equal to a baseline value; and means for connecting the first impedance circuit to the output of the second coupling means when the impedance of the input of the first coupling means is not substantially equal to the baseline value, and for connecting the second impedance circuit to the output of the second coupling means when the impedance of the input of the second coupling means is substantially equal to the baseline value.

14. A line interface, comprising:

a first transformer having a first winding and a second winding, the second winding of the first transformer being connected to a loop with one or more taps;

a second transformer having a first winding and a second winding, the first winding of the first transformer being connected in series with the first winding of the second transformer;

a first impedance circuit selectively connectable to the second winding of the second transformer, the impedance of the first impedance circuit being representative of the loop impedance of at least a first loop;

a second impedance circuit selectively connectable to the second winding of the second transformer, the impedance of the second impedance circuit being representative of the loop impedance of at least a second loop;

means connected to the first winding of the first transformer for measuring the magnitude of an echo signal; and means for connecting the first impedance circuit to the second winding of the second transformer when the echo signal has a magnitude that is at least as great as a threshold magnitude, and for connecting the second impedance circuit to the second winding of the second transformer when the magnitude of the echo signal is less than the threshold magnitude.

15. The line interface of claim 14 wherein the first impedance circuit is a first reactive circuit that comprises the parallel combination of a resistor R4 and a capacitor C3 connected in series with the parallel combination of a resistor R5 and a capacitor C4 connected in series with the parallel combination of an inductor L and a resistor R6 and a capacitor C5.

16. The line interface of claim 14 wherein the second impedance circuit is a second reactive circuit that comprises the parallel combination of a resistor R1 and a capacitor C1 connected in series with the parallel combination of a resistor R2 and a capacitor C2 connected in series with a resistor R3.

17. The line interface of claim 14 wherein the first impedance circuit has an impedance that is about equal to the loop impedance of each of the loops in a group of problematic loops.

18. The line interface of claim 14 wherein the second impedance circuit has an impedance that is about equal to the loop impedance of each of the loops in a group of non-problematic loops.

19. The apparatus of claim 14 further comprising a high pass filter and a low pass filter connected in series with the first winding of the first transformer.

20. A method for matching the output impedance of a line interface to the input impedance of a loop with one or more taps, comprising:

receiving a composite signal that includes an echo signal;

producing an approximation of the echo signal;

subtracting the approximation of the echo signal from the composite signal;

comparing the result of the subtraction to a threshold value; and selectively connecting a first impedance or a second impedance in series with a first winding of a line coupling transformer of the line interface, the first impedance being connected if the result of the subtraction is at least as great as the threshold value, the second impedance being connected if the result of the subtraction is less than the threshold value.

* * * * *

UNITED STATES PATENT AND TRADEMARK OFFICE
CERTIFICATE OF CORRECTION

PATENT NO.   : 6,400,772 B1
DATED        : June 4, 2002
INVENTOR(S)  : Chaplik

It is certified that error appears in the above-identified patent and that said Letters Patent is hereby corrected as shown below:

<u>Column 18,</u>
Line 34, please change "apparatus" to -- line interface --

Signed and Sealed this

Twenty-sixth Day of November, 2002

Attest:

Attesting Officer

JAMES E. ROGAN
*Director of the United States Patent and Trademark Office*